United States Patent
Strasman et al.

(10) Patent No.: US 10,136,355 B2
(45) Date of Patent: Nov. 20, 2018

(54) REDUCING SIGNALING LOAD ON A MOBILE NETWORK

(71) Applicant: Vasona Networks Inc., Santa Clara, CA (US)

(72) Inventors: Nery Strasman, Ramat Gan (IL); Ariel Peltz, Tel Aviv (IL); Ofer Weill, Modiin (IL)

(73) Assignee: Vasona Networks, Inc., San Jose, CA (US)

( * ) Notice: Subject to any disclaimer, the term of this patent is extended or adjusted under 35 U.S.C. 154(b) by 408 days.

(21) Appl. No.: 13/685,241

(22) Filed: Nov. 26, 2012

(65) Prior Publication Data

US 2014/0146665 A1    May 29, 2014

(51) Int. Cl.
*H04W 28/02*    (2009.01)
*H04L 12/823*   (2013.01)

(52) U.S. Cl.
CPC ....... *H04W 28/0289* (2013.01); *H04L 47/323* (2013.01)

(58) Field of Classification Search
CPC ......... H04L 47/14; H04L 47/10; H04L 47/11; H04L 47/283; H03L 47/127
USPC ..................... 370/230, 235, 230.1
See application file for complete search history.

(56) References Cited

U.S. PATENT DOCUMENTS

| | | | |
|---|---|---|---|
| 5,550,914 A | 8/1996 | Clarke et al. | |
| 5,850,385 A * | 12/1998 | Esaki | 370/395.21 |
| 7,248,564 B1 | 7/2007 | Grosdidier et al. | |
| 7,349,332 B1 | 3/2008 | Srinivasan et al. | |
| 7,466,652 B2 | 12/2008 | Lau et al. | |
| 8,099,492 B2 | 1/2012 | Dahlin et al. | |
| 8,189,479 B1 | 5/2012 | Doherty et al. | |
| 8,559,967 B2 | 10/2013 | Froehlich et al. | |
| 8,654,694 B2 * | 2/2014 | Chang et al. | 370/311 |
| 8,660,009 B2 | 2/2014 | Dahle'n | |
| 8,677,473 B2 * | 3/2014 | Dennerline et al. | 726/13 |
| 2003/0067903 A1 | 4/2003 | Jorgensen | |

(Continued)

FOREIGN PATENT DOCUMENTS

| | | |
|---|---|---|
| EP | 1876779 A2 | 1/2008 |
| EP | 2448361 A1 | 5/2012 |

(Continued)

OTHER PUBLICATIONS

Deep Packet Inspection, http://en.wikipedia.org/wiki/Deep_packet_inspection, Oct. 30, 2012.

(Continued)

*Primary Examiner* — Joseph A Bednash
(74) *Attorney, Agent, or Firm* — D. Kligler IP Services Ltd.

(57) ABSTRACT

One or more packets associated with a wakeup event for a mobile user device is/are delayed, thereby extending the duration of the wakeup event. Because the duration of the wakeup event is extended, the start of the next wakeup event for the mobile user device is delayed by a time interval, and therefore the signaling load on the mobile network is reduced during this time interval compared to the signaling load that would have been on the mobile network if the start of the next wakeup event had not been delayed. If the delayed packet(s) is/are data packet(s), then the disclosure presents a solution which involves data to solve a problem relating to signaling.

28 Claims, 6 Drawing Sheets

(56) References Cited

U.S. PATENT DOCUMENTS

| | | |
|---|---|---|
| 2003/0227912 A1 | 12/2003 | Kachi |
| 2004/0052234 A1 | 3/2004 | Ameigeiras et al. |
| 2004/0058652 A1 | 3/2004 | McGregor et al. |
| 2005/0041582 A1 | 2/2005 | Hancock et al. |
| 2005/0047396 A1 | 3/2005 | Helm et al. |
| 2005/0107087 A1* | 5/2005 | Makinen et al. ............. 455/450 |
| 2006/0146749 A1 | 7/2006 | Lundh et al. |
| 2006/0262788 A1 | 11/2006 | Johnson et al. |
| 2007/0019552 A1 | 1/2007 | Senarath et al. |
| 2007/0091799 A1 | 4/2007 | Wiemann et al. |
| 2007/0153695 A1 | 7/2007 | Gholmieh et al. |
| 2007/0189262 A1 | 8/2007 | Kim et al. |
| 2008/0008203 A1 | 1/2008 | Frankkila et al. |
| 2008/0285496 A1* | 11/2008 | Fuchs et al. .................. 370/311 |
| 2009/0164657 A1 | 6/2009 | Li et al. |
| 2009/0310500 A1 | 12/2009 | Matsuda |
| 2009/0325512 A1 | 12/2009 | Granlund et al. |
| 2010/0020685 A1 | 1/2010 | Short et al. |
| 2010/0188975 A1 | 7/2010 | Raleigh |
| 2010/0189063 A1 | 7/2010 | Kokku et al. |
| 2010/0250767 A1 | 9/2010 | Barreto et al. |
| 2010/0278042 A1 | 11/2010 | Monnes et al. |
| 2011/0072152 A1 | 3/2011 | Lee et al. |
| 2011/0096665 A1 | 4/2011 | McCann et al. |
| 2011/0141896 A1 | 6/2011 | Willey et al. |
| 2011/0170412 A1 | 7/2011 | Ramadas et al. |
| 2011/0299454 A1 | 12/2011 | Krishnaswamy |
| 2012/0017121 A1 | 1/2012 | Carlson et al. |
| 2012/0039169 A1 | 2/2012 | Susitaival et al. |
| 2012/0082033 A1 | 4/2012 | Pongracz et al. |
| 2012/0106331 A1* | 5/2012 | De Pasquale et al. ....... 370/230 |
| 2012/0106338 A1 | 5/2012 | Pongracz et al. |
| 2012/0140624 A1 | 6/2012 | Denman et al. |
| 2012/0155386 A1 | 6/2012 | Krishnaswamy et al. |
| 2012/0176896 A1 | 7/2012 | Denman |
| 2012/0207069 A1 | 8/2012 | Xu et al. |
| 2012/0224536 A1 | 9/2012 | Hahn et al. |
| 2012/0327779 A1 | 12/2012 | Gell et al. |
| 2013/0021928 A1 | 1/2013 | Weill et al. |
| 2013/0021933 A1 | 1/2013 | Kovvali et al. |
| 2013/0024523 A1 | 1/2013 | Albasheir et al. |
| 2013/0100816 A1 | 4/2013 | Bergamasco et al. |
| 2013/0165130 A1* | 6/2013 | Wu et al. ...................... 455/444 |
| 2013/0170358 A1 | 7/2013 | Chen et al. |
| 2013/0250765 A1 | 9/2013 | Ehsan et al. |
| 2013/0250853 A1 | 9/2013 | Eravelli et al. |
| 2013/0286845 A1 | 10/2013 | Smith, Jr. et al. |
| 2014/0043969 A1 | 2/2014 | Xu |
| 2014/0051485 A1* | 2/2014 | Wang .................. H04B 7/2656 455/574 |
| 2014/0092741 A1 | 4/2014 | Williams et al. |
| 2014/0192639 A1 | 7/2014 | Smirnov |
| 2014/0194137 A1 | 7/2014 | Do et al. |
| 2015/0043346 A1 | 2/2015 | Miller |
| 2015/0098352 A1 | 4/2015 | Froehlich |
| 2015/0117195 A1 | 4/2015 | Toy |
| 2015/0131555 A1 | 5/2015 | Lee et al. |

FOREIGN PATENT DOCUMENTS

| | | |
|---|---|---|
| EP | 2661030 A2 | 11/2013 |
| WO | 02030042 A1 | 4/2002 |
| WO | 2011156264 A2 | 12/2011 |
| WO | 2012062348 A1 | 5/2012 |
| WO | 2013077786 A1 | 5/2013 |

OTHER PUBLICATIONS

Manage the Apps, Manage Your Network: Enabling Operators to Control App Signaling Traffic and Reduce Network Costs, http://www.openet-telecom.com/resources/downloads, Aug. 28, 2012.

Allot Communications and Deep Packet Inspection, http://ithacaexperiment.blogspot.co.il/2012/03/allot-communications-and-deeppacket.html, Mar. 13, 2012.

Traffic Mediation 2012: The Right Way to Process Content in 4G, http://www.openwave.com/sites/default/files/docs/solutions/4GPositioningPaper_FINAL_12-20-11.pdf, Dec. 20, 2011.

Data Sheet: Cisco SCE 2000 Series Service Control Engine, http://www.cisco.com/en/US/prod/collateral/ps7045/ps6129/ps6133/ps6151/product_data_sheet0900aecd801d8574.pdf, Aug. 28, 2012.

Procera Networks Deploys One of the World's Lar-Packet Inspection Systems, http://www.proceranetworks.com/pressrelease-archive/564-procera-networksdeploys-one-of-the-worlds-largest-deep-packet-inspection-systems.html, Aug. 28, 2012.

EP Application # 13857317.5 Search report dated Jul. 18, 2016.
U.S. Appl. No. 14/077,788 Office Action dated Oct. 14, 2016.
U.S. Appl. No. 14/077,628 Office Action dated Nov. 4, 2016.
European Application # 13897461.3 Search Report dated Jun. 29, 2017.
European Application # 13897399.5 Search Report dated Jun. 1, 2017.
U.S. Appl. No. 14/077,788 Office Action dated Jul. 7, 2017.
U.S. Appl. No. 14/077,628 Office Action dated Jul. 31, 2017.
U.S. Appl. No. 14/077,628 office action dated Jan. 30, 2018.
EP Application # 13897447.2 office action dated Feb. 14, 2018.
European Application # 13897447.2 Search Report dated Mar. 16, 2017.
European Application # 13897340.9 Search Report dated Mar. 29, 2017.
International Application # PCT/IL2013/050922 Search Report dated Feb. 23, 2014.
U.S. Appl. No. 14/077,628 office action dated Sep. 4, 2018.

\* cited by examiner

Fig. 7

REDUCING SIGNALING LOAD ON A MOBILE NETWORK

TECHNICAL FIELD

The disclosure relates to mobile data services.

BACKGROUND

A mobile user device may periodically wake up and re-access a public data network (PDN) such as the Internet via a mobile network. For instance, depending on the applications on the mobile device, the mobile user device may access the PDN in order to determine if there are any new emails, posts, etc.

The periodic wakeup by a mobile user device may conserve battery life compared to maintaining an open session. However, the signaling relating to the periodic wakeup adds to the load on the mobile network. The additional load from the signaling due to wakeup of numerous mobile user devices may negatively impact the ability of the mobile network to support user-initiated connections to the mobile network.

SUMMARY

In accordance with one aspect of the presently disclosed subject matter, there is provided an intercept module capable of reducing signaling load on a mobile network, comprising: an inspection module capable of determining that at least one packet is to be delayed at least partly because the at least one packet relates to a wakeup event for a mobile user device; and a delay module capable of delaying the at least one packet, thereby causing a start of a next wakeup event for the mobile user device to be delayed by a time interval, and a consequent reduction in the signaling load on the mobile network during the interval compared to the signaling load that would have been on the mobile network during the interval if the start had not been delayed.

In some examples of the intercept module, at least one of the at least one packet is a data packet.

In some examples of the intercept module, the delay module is capable of delaying the at least one packet by storing the at least one packet temporarily in memory.

In accordance with another aspect of the presently disclosed subject matter, there is provided a network comprising an intercept module capable of reducing mobile network signaling load, the intercept module comprising: an inspection module capable of determining that at least one packet is to be delayed at least partly because the at least one packet relates to a wakeup event for a mobile user device, and a delay module capable of delaying the at least one packet, thereby causing a start of a next wakeup event for the mobile user device to be delayed by a time interval, and a consequent reduction in the signaling load on the mobile network during the interval compared to the signaling load that would have been on the mobile network during the interval if the start had not been delayed.

In some examples, the network includes a core mobile network and the intercept module or a part thereof is located in the core mobile network.

In some examples, the network includes a gateway or access network and a core mobile network, and the intercept module or a part thereof is located between the gateway or access network and the core mobile network.

In some examples, the network includes a gateway or access network, and the intercept module or a part thereof is located in the gateway or access network.

In some examples, the network includes a core mobile network and a public data network, and the intercept module or a part thereof is located between the core mobile network and the public data network.

In some examples, the network includes a mobile user device and a gateway or access network, and the intercept module or a part thereof is located between a mobile user device and the gateway or access network.

In accordance with another aspect of the presently disclosed subject matter, there is provided a method of reducing signaling load on a mobile network, comprising: determining that at least one packet is to be delayed at least partly because the at least one packet relates to a wakeup event for a mobile user device; and delaying the at least one packet, thereby causing a start of a next wakeup event for the mobile user device to be delayed by a time interval, and a consequent reduction in the signaling load on the mobile network during the interval compared to the signaling load that would have been on the mobile network during the interval if the start had not been delayed.

In some examples of the method, only one packet relating to the wakeup event is delayed.

In some examples of the method, a plurality of packets relating to the wakeup event is delayed.

In some examples of the method, the determining includes: determining that a packet is to be delayed at least partly because the packet is a data packet.

In some examples of the method, the determining includes: determining that a packet is to be delayed at least partly based on timing.

In some examples of the method, the determining includes: determining that a packet is to be delayed at least partly based on mobile device identification.

In some examples of the method, the determining includes: determining that a packet is to be delayed at least partly based on flow direction of packet.

In some examples of the method, the determining includes: determining that a packet is to be delayed at least partly based on at least one preceding packet.

In some examples of the method, the determining includes: determining that a packet is to be delayed at least partly based on load.

In some examples of the method, at least one of the at least one packet is delayed by a variable delay whose value is dependent on at least one factor. In some of these examples, the factor includes at least one selected from a group comprising: timing, identification of mobile user device, load, policy, service identification, or network happening.

In some examples of the method, at least one of the at least one packet is delayed by a standard delay or by a randomly selected variable delay.

In accordance with another aspect of the presently disclosed subject matter, there is provided a computer program product comprising a non-transitory computer useable medium having computer readable program code embodied therein for reducing signaling load on a mobile network, the computer program product comprising: computer readable program code for causing the computer to determine that at least one packet is to be delayed at least partly because the at least one packet relates to a wakeup event for a mobile user device; and computer readable program code for causing the computer to delay the at least one packet, thereby causing a start of a next wakeup event for the mobile user device to be delayed by a time interval, and a consequent reduction in the signaling load on the mobile network during the interval compared to the signaling load that would have been on the mobile network during the interval if the start had not been delayed.

BRIEF DESCRIPTION OF THE DRAWINGS

In order to understand the subject matter and to see how it may be carried out in practice, non-limiting examples will be described, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate identical or analogous elements.

DETAILED DESCRIPTION OF THE DRAWINGS

Described herein are some examples of reducing the signaling load on a mobile network due to mobile user device wakeup event(s).

In the following detailed description, numerous specific details are set forth in order to provide a thorough understanding of the subject matter. However, it will be understood by those skilled in the art that some examples of the subject matter may be practiced without these specific details. In other instances, well-known stages, methods, modules, elements, and systems have not been described in detail so as not to obscure the subject matter.

Usage in the specification of the term "for example," "such as", "for instance", "e.g.", "possibly", "optionally", "say", "one example", "illustrated example", "some examples", "another example", "other examples, "various examples", "one instance", "some instances", "another instance", "other instances", "one case", "some cases", "another case", "other cases" or variants thereof means that a particular described feature, structure or characteristic is included in at least one non-limiting example of the subject matter, but not necessarily in all examples. The appearance of the same term does not necessarily refer to the same example(s).

The term "illustrated example", is used to direct the attention of the reader to one or more of the figures, but should not be construed as necessarily favoring any example over any other.

The term "wakeup event" is used below to refer to a single wakeup of a mobile user device. The term "wakeup events" is used below to refer to a plurality of wakeups of the same mobile user device and/or of different mobile user device(s).

The term "memory" is used below to refer to any module for storing data for the short and/or long term, locally and/or remotely. Examples of memory include inter-alia: any type of disk including floppy disk, hard disk, optical disk, CD-ROMs, magnetic-optical disk, magnetic tape, flash memory, random access memory (RAMs), dynamic random access memory (DRAM), static random access memory (SRAM), read-only memory (ROMs), programmable read only memory PROM, electrically programmable read-only memory (EPROMs), electrically erasable and programmable read only memory (EEPROMs), magnetic card, optical card, any other type of media suitable for storing electronic instructions and capable of being coupled to a system bus, a combination of any of the above, etc It should be appreciated that certain features, structures and/or characteristics disclosed herein, which are, for clarity, described in the context of separate examples, may also be provided in combination in a single example. Conversely, various features, structures and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "reducing", "signaling", "determining", "delaying", "storing", "passing", "inspecting", "intercepting", "retaining", "extending", "imposing", "performing", "executing", "implementing", or the like, refer to the action(s) and/or process(es) of any combination of software, hardware and/or firmware. For example, these terms may refer in some cases to the action(s) and/or process(es) of one or more computer(s), that manipulate(s) and/or transform(s) data represented as physical, such as electronic quantities, within the registers and/or memories of the computer(s) into other data similarly represented as physical quantities within the registers, memories, and/or other such information storage, transmission and/or display element(s) of the computer(s). The term "computer" should be expansively construed to cover any kind of electronic system which includes at least some hardware and has data processing capabilities even if not labeled as such. Examples of such a computer include, a personal computer, a server, a computing system, a communication device, a processor (e.g. digital signal processor (DSP), a microcontroller, a field programmable gate array (FPGA), an application specific integrated circuit (ASIC), etc.), any combination thereof, etc.

Referring now to the figures in more detail, FIGS. 1A, 1B, 1C, 1D, and 1E are block diagrams of examples of network 100A, 100B, 100C, 100D, and 100E respectively, each including a mobile network with reduced signaling load, in accordance with the presently disclosed subject matter. The label "FIG. 1" is used to refer to one or more of FIGS. 1A, 1B, 1C, 1D, and 1E. The label "100" is used to refer to one or more of network(s) 100A, 100B, 100C, 100D and/or 100E.

For example, network 100 may include one or more mobile user devices 110, one or more gateway(s) and/or access network(s) 115, a core mobile network 120 and a public data network PDN 195. For simplicity of illustration, only one mobile user 110 device and gateway/access network 115 are illustrated in FIG. 1. Also included in network 100 is an intercept module 180 which may be located anywhere along the path between mobile user device 110 and PDN 195, for instance in core mobile network 120 (see FIG. 1A), between core mobile network 120 and PDN 195 (see FIG. 1B), between gateway/access network 115 and core mobile network 120 (see FIG. 1C), between mobile user device 110 and gateway/access network 115 (see FIG. 1D), in gateway/access network 115 (see FIG. 1E), etc. It is also possible that different parts of intercept module 180 may be located at different locations along the path between mobile user device 110 and PDN 195 for instance with different parts of intercept module 180 at different locations in core network 120, between core mobile network 120 and PDN 195, between gateway/access network 115 and core mobile network 120, between mobile user device 110 and gateway/access network 115, in gateway/access network 115, in any combination of the above, etc.

Mobile user device 110 may be any user device configured to access PDN 195 via gateway/access network 115 and mobile core network 120. Examples of a mobile user device 110 include Smartphone, feature phone, tablet computer, personal computer connecting to gateway/access network 115 via a USB dongle, etc.

Gateway/access network 115 may be any gateway or access network configured to connect between mobile user device 100 and core mobile network 120. For instance, a base station, nodeB, base transceiver station, radio base station, enodeB, etc. are examples of a gateway. For instance, WiFi, Worldwide Interoperability for Microwave Access (WiMAX), etc. are examples of an access network.

Core mobile network 120 may be any core mobile network. Core mobile network 120 includes a data network and optionally a voice network. Examples of core mobile network 120 include General Packet Radio Service (GPRS), Universal Mobile Telecommunications System (UMTS), Long Term Evolution (LTE), Code Division Multiple Access 2000 (CDMA2000), any network of any appropriate generation, etc.

The term "mobile network" is used herein to denote any mobile network which includes a core mobile network and optionally other element(s). Therefore when describing a reduced signaling load on a mobile network, it should be understood that at least the signaling load on the core mobile network is reduced and optionally the signaling load may be reduced elsewhere. Optionally, the data load may also be reduced on the mobile network.

PDN 195 may be any public data network. For example PDN 195 may be the Internet. Although the disclosure refers to network 195 as a public data network, in other examples network 195 may be a private network, with similar functionality to what is described herein mutatis mutandis.

Figure 1A:
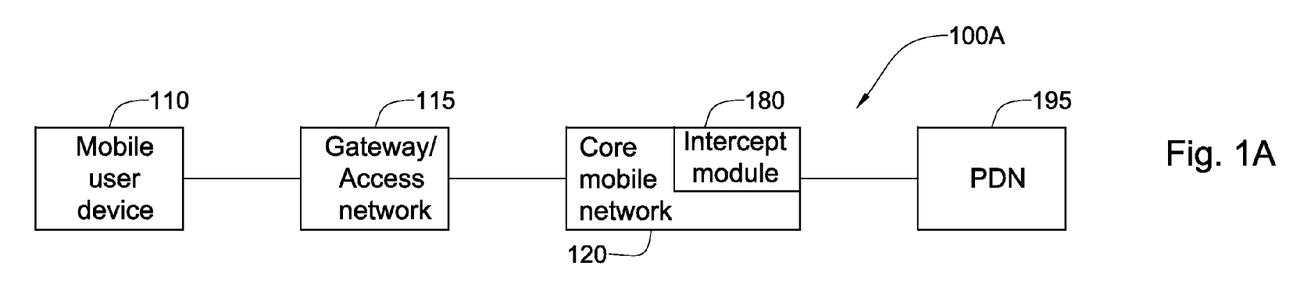
FIG. 1A is a block diagram of an example of a network including a mobile network with reduced signaling load, in accordance with the presently disclosed subject matter.
Figure 1B:
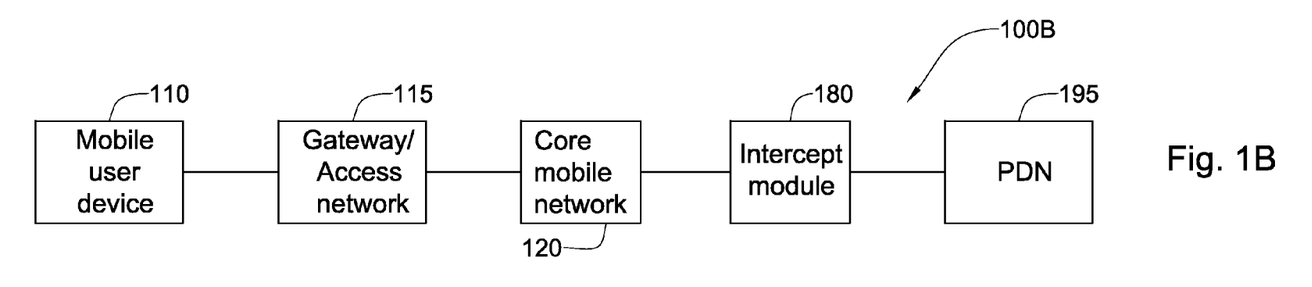
FIG. 1B is a block diagram of another example of a network including a mobile network with reduced signaling load, in accordance with the presently disclosed subject matter.
Figure 1C:
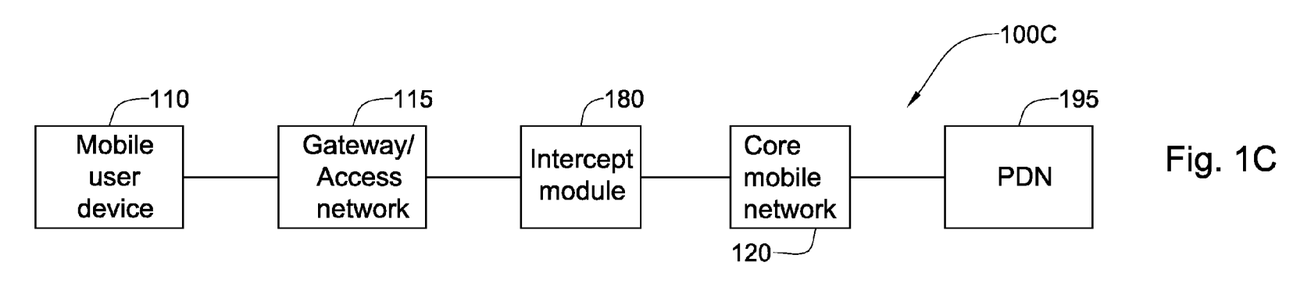
FIG. 1C is a block diagram of another example of a network including a mobile network with reduced signaling load, in accordance with the presently disclosed subject matter.
Figure 1D:
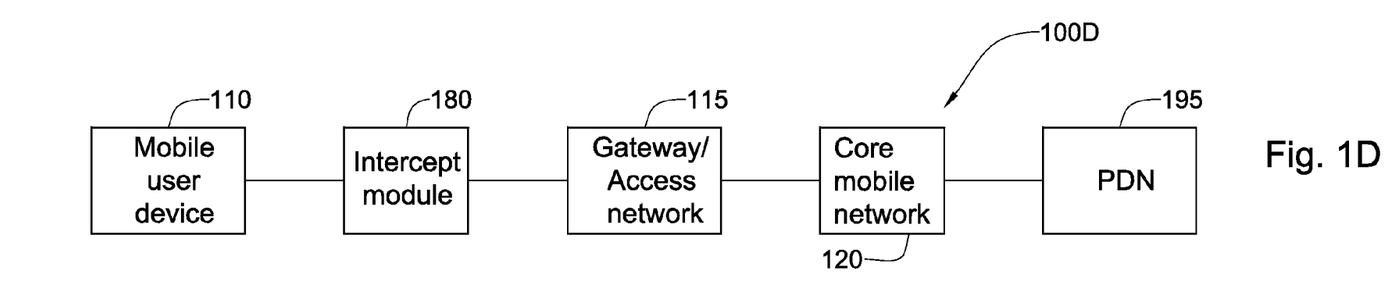
FIG. 1D is a block diagram of another example of a network including a mobile network with reduced signaling load, in accordance with the presently disclosed subject matter.
Figure 1E:
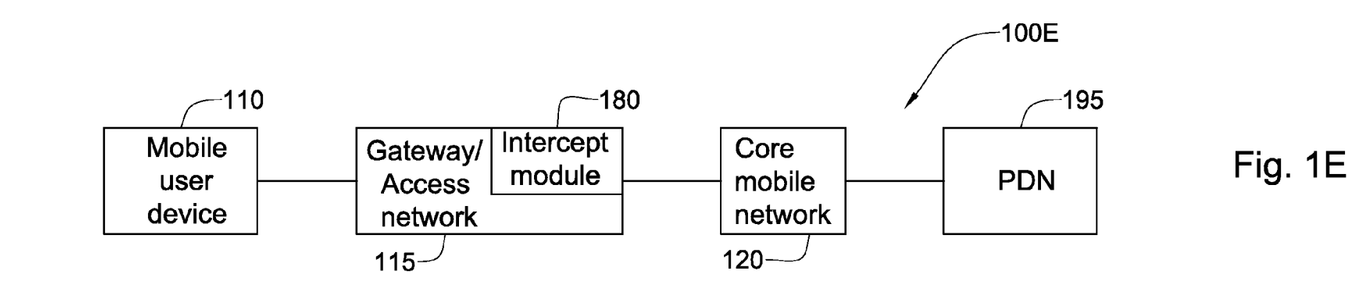
FIG. 1E is a block diagram of another example of a network including a mobile network with reduced signaling load, in accordance with the presently disclosed subject matter.
Figure 2:
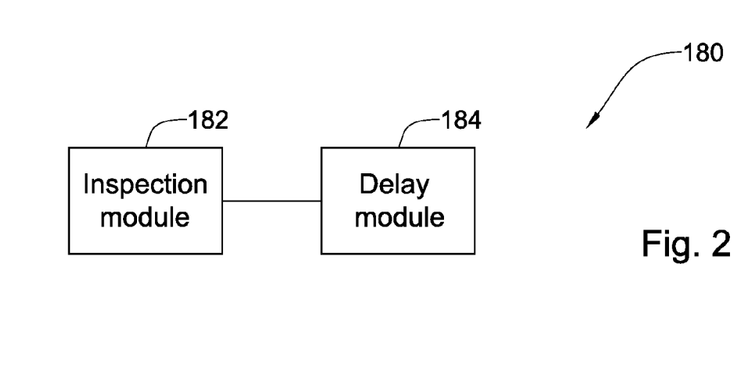
FIG. 2 is a block diagram of an example of an intercept module, in accordance with the presently disclosed subject matter.

FIG. 2 is a block diagram of an example of an intercept module 180, in accordance with the presently disclosed subject matter.

For simplicity of description, in the illustrated example, intercept module 180 is shown as including an inspection module 182 and a delay module 184. (As mentioned below, it is alternatively possible that intercept module 180 is not divided into modules or is divided into more modules).

In various examples, each of modules 180 182 and 184 illustrated in FIG. 2 may be made up of any combination of software, hardware and/or firmware that performs the functions as described and explained herein. In some of these examples, intercept module 180 or a part thereof may at least partly comprise or be comprised in one or more computer(s) specially constructed for the desired purposes, and/or may at least partly comprise or be comprised in one or more computer(s) selectively activated or reconfigured by specially constructed program code. Depending on the example, intercept module 180 may be a standalone module or may be part of an element which has additional functionality.

Inspection module 182 may be configured, for instance, to inspect passing packets in order to determine whether or not a packet is to be delayed by delay module 184. The performed inspection may, for instance, include deep packet inspection.

Inspection module 182 may be configured to determine that a packet is to be delayed at least partly because the packet relates to a wakeup event. By the term "at least partly because" it should be understood that the determination that a packet is to be delayed may not necessarily be made only because the packet relates to a wakeup event, and therefore it is not necessarily determined that all packets relating to wakeup events are to be delayed. For instance, the determination may also be at least partly based on one or more other considerations such as those described below. Inspection module 182 may or may not be configured to determine that a packet is to be delayed even though the packet does not relate to a wakeup event. Depending on the example, inspection module 182 may be configured to determine that one packet or a plurality of packets relating to a wakeup event is to be delayed. In one example, inspection module 182 may be configured to determine that one or more data packets originating from a mobile device 110 due to a wakeup event and sent after the signaling is/are to be delayed, for instance a data packet sent after the signaling which includes a request for updates. However this is not necessarily so and the disclosure does not impose limitations on how inspection module 182 may be configured to determine which packet(s) is/are to be delayed. For instance, in various examples, the determination that a packet is to be delayed may be at least partly based on one or more considerations such as the type of packet (e.g. data or control), on which mobile user device 110 originates the packet or is the intended destination of the packet, on packet characteristic, on direction of packet flow, on timing, on which packet(s) preceded the packet, and/or on load, etc.

Assuming a determination that is at least partly based on type of packet, then in one example inspection module 182 may be configured to determine whether or not a packet is to be delayed based on whether or not the packet is a data packet, or conversely based on whether or not the packet is a control packet. Control packets are used for signaling and are the vehicle for carrying control messages.

Assuming a determination that is at least partly based on which mobile user device 110 originates the packet or is the intended destination of the packet, then in one example inspection module 182 may be configured to determine whether or not a packet is to be delayed at least partly based on identification of mobile user device 110 (e.g. international mobile equipment identity IMEI).

Assuming a determination that is at least partly based on a packet characteristic, then in one example, inspection module 142 may be configured to look for any appropriate pattern (also known as signature) characterizing a packet associated with a wakeup event which is to be delayed. In this example, the determination that a packet is to be delayed is at least partly because the packet relates to a wakeup event, but it is not necessarily determined that all packets relating to wakeup events are to be delayed.

Assuming a determination at least partly based on packet flow, then in one example inspection module 182 may be configured to determine whether or not a packet is to be delayed at least partly based on whether or not the packet originated from mobile user device 110 or is intended for mobile user device 110.

Assuming a determination at least partly based on timing, then in one example inspection module 182 may be configured to determine whether or not a packet is to be delayed, at least partly based on time of day. Additionally or alternatively, assuming a determination at least partly based on timing, then in one example, inspection module 182 may be configured to determine whether or not a packet is to be delayed, at least partly based on the timing of the packet during a wakeup event. Additionally or alternatively, assuming a determination at least partly based on timing, then in one example inspection module 182 may be configured to determine whether or not a packet is to be delayed at least partly based on number of time units, number of events, and/or any other quantity which has elapsed since the last delay of packets(s). Continuing with the latter example and focusing on packet(s) relating to a wakeup event, say only every x time unit(s), at least one packet associated with a wakeup event may be delayed, or say only every y wakeup event(s) at least one associated packet may be delayed. In this example, tracking may be performed for each mobile user device 110 separately (e.g. only every x time unit(s), and/or only every y wakeup event(s) relating to a particular mobile user device 110, packet(s), associated with that mobile user device 110, may be delayed). Alternatively, in this example collective tracking may be performed for all mobile user devices 110 whose packets associated with wakeup events may be inspected and delayed by intercept module 180 (e.g. only every x time unit(s), and/or only every y wakeup event(s), packet(s), associated with a wakeup event of any of those mobile user devices 110, may be delayed).

Assuming a determination at least partly based on preceding packet(s), then in one example inspection module 182 may be configured to determine whether or not a packet is to be delayed at least partly based on whether or not preceding packet(s) included control packet(s) conveying a control message such as an attach or similar message which is sent when there is a wakeup event, and/or conveying expected query/ies (e.g. to server in PDN 195).

Assuming a determination at least partly based on load (signaling and/or data), then in one example inspection module 182 may be configured to determine whether or not a packet is to be delayed at least partly based on the load on core mobile network 120 and/or elsewhere.

Delay module 184 may be configured to delay packet(s) which inspection module 182 determined is/are be delayed. For instance, any packet may be delayed by storing the packet temporarily in memory, e.g. in a buffer in memory, until the duration of the delay has elapsed (e.g. timeout has occurred) upon which the packet may continue to intended destination thereof. In this instance, the memory used for storing delayed packet(s) may be internal to delay module 184, outside of delay module 184 but internal to inspection module 180, and/or external to inspection module 180. However this way of delaying is not necessarily performed in all examples and depending on the example delay module 184 may perform the delaying in any appropriate manner.

The duration of a wakeup event for a mobile user device may be extended if the delayed packet(s) relate to a wakeup event, and therefore the start of the next wakeup event for the mobile user device may be delayed by a time interval.

The disclosure does not impose limitations on how long a packet may be delayed by delay module 184. For example, the delay may be a standard (i.e. fixed) delay or may be a variable delay. A variable delay may vary based on one or more factors, such as timing, identification of mobile user device, load, policy, identification of specific service, network happening (i.e. what else happened or is happening in the network), etc, and/or a variable delay may vary due to random selection. The standard or variable delay may be for any appropriate amount of time. For instance, an appropriate delay for delaying a packet may possibly be in the order of a few seconds, but this is not necessarily the case in all examples.

Assuming a variable delay based at least partly on timing, then in one example delay module 184 may be configured to determine how long to delay a packet, at least partly based on time of day. Additionally or alternatively, assuming a determination at least partly based on timing, then in one example delay module 184 may be configured to determine how long to delay a packet at least partly based on the time-length of earlier delays. Continuing with the latter example, say a longer delay for the last delayed packet (or for the last delayed packet associated with the same particular mobile user device 110) may be followed by a shorter delay for the next delayed packet (or for the last delayed packet associated with the same particular mobile user device 110).

Assuming a variable delay at least partly based on mobile user device 110, then in one example delay module 184 may be configured to determine how long to delay a packet, at least partly based on identification of mobile user device 110 (e. IMEI). Continuing with this example, a packet associated with a priority mobile user device 110 (e.g. with a higher end mobile plan) may be delayed for a shorter period of time.

Assuming a variable delay at least partly based on load (signaling and/or data), then in one example delay module 182 may be configured to determine how long to delay a packet, at least partly based on the load on core mobile network 120 and/or elsewhere.

Assuming a variable delay at least partly based on policy, then in one example delay module 182 may be configured to determine how long to delay a packet, at least partly based on policy of an operator of core mobile network 120 and/or of a different part of network 100.

Assuming a variable delay at least partly based on service, then in one example delay module 182 may be configured to determine how long to delay a packet, at least partly based on the session, such as the type of session, who is serving the session (e.g. Uniform Resource Locator URL, owner of URL, etc), content of the session, etc.

Assuming a variable delay at least partly based on what is happening or happened in the network, then in one example, delay module 182 may be configured to determine how long to delay a packet, at least partly based on what is happening or happened in core mobile network 120 and/or in a different part of network 100.

In various instances, intercept module 180 may be centralized in one location or dispersed over more than one location. For instance inspection module 182 may or may not be located in a position which allows inspection module 182 to inspect a packet prior to the packet passing by delay module 184. If not located in such a position then delay module 184 may be configured to hold a packet until receiving instruction from inspection module on whether or not to delay the packet. Additionally or alternatively, for instance, inspection module 182 may be configured to communicate with delay module 184 even if not co-located so that delay module 184 may receive instruction from inspection module 182 on whether or not to delay a packet.

Alternatively to the example shown in FIG. 2, intercept module 180 may in some examples include fewer, more and/or different modules than shown in FIG. 2. For example, both modules 182 and 184 may be combined into one unified module (or equivalently intercept module 180 may be a unified module that is not divided into modules). In this example, the unified module may implement some or all of the functions attributed herein to either of modules 182 and 184. Additionally or alternatively for example, intercept module 180 may include memory, in delay module 184 and/or elsewhere. Alternatively to the example shown in FIG. 2, the functionality of intercept module 180 may in some examples be divided differently among the modules illustrated in FIG. 2. Alternatively to the example shown in FIG. 2, the functionality of intercept module 180 described herein may in some examples be divided into fewer, more and/or different modules than shown in FIG. 2 and/or intercept module 180 may in some examples include additional, less, and/or different functionality than described herein.

Figure 3:
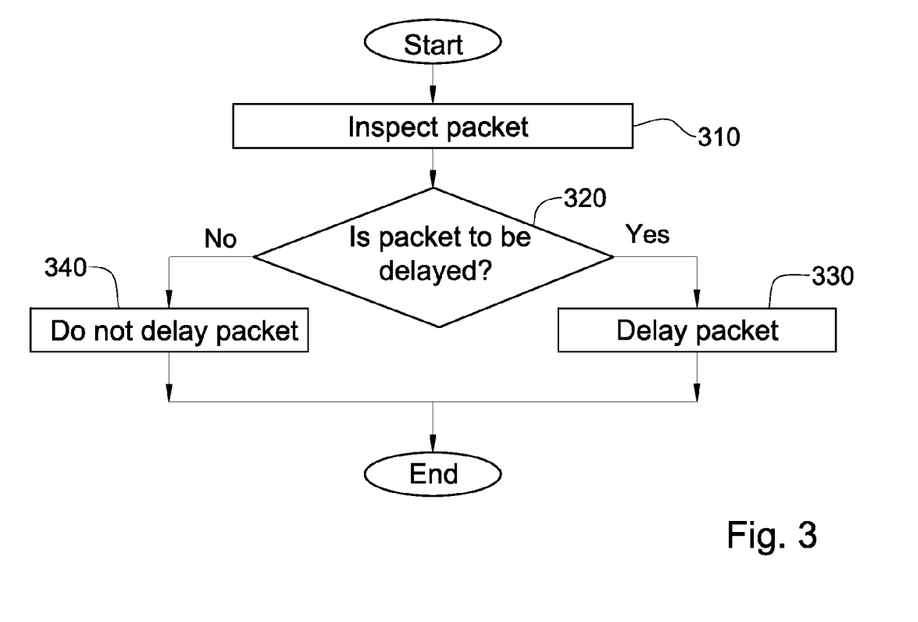
FIG. 3 is a flowchart of an example of a method of intercepting a packet, in accordance with the presently disclosed subject matter.

FIG. 3 is a flowchart of an example of a method 300 of intercepting a packet, in accordance with the presently disclosed subject matter. Method 300 may be performed for example by intercept module 180.

Depending on the example, a packet relating to a wakeup event may or may not be delayed due to execution of method 300 (whereas a packet not relating to a wakeup event would not be delayed), or a packet not necessarily relating to a wakeup event may or may not be delayed due to execution of method 300. If it is possible that a packet not related to a wakeup event may be delayed due to execution of method 300, then method 300 may be performed independently of the timing of wakeup events, for instance whenever a packet is accessible to intercept module 180 (e.g. inspection module 182). If only a packet relating to a wakeup event may be delayed due to execution of method 300, then method 300 may be performed independently of the timing of wakeup events, for instance whenever a packet is accessible to intercept module 180 (e.g. inspection module 182), or may be performed once intercept module 180 (e.g. inspection module 182) has detected the beginning of a wakeup event, say based on detecting an "attach" or similar control message during packet inspection (Although alternatively the detection may require at least partial performance of method 300).

It is assumed that each time there is a wakeup event where mobile user device 110 wakes up in order to access PDA 195 via gateway/access network 115 and core mobile network 120, one or more control packet(s) and/or data packet(s) associated with the wakeup event flow (in either direction) via gateway/access network 115 and core mobile network 120.

In the illustrated example, in stage 310, intercept module 180, for instance inspection module 182, inspects a packet.

In the illustrated example, in stage 320, intercept module 180, for instance inspection module 182, determines whether or not the packet is to be delayed.

Refer back to the discussion of FIG. 2 for some examples of how inspection module 182 may be configured to determine that a packet is to be delayed. In some examples, the determination that a packet is to be delayed is at least partly because the packet relates to a wakeup event, meaning that it is not necessarily determined that all packets relating to wakeup events are to be delayed.

If it is determined that the packet is to be delayed (yes to stage 320), then in the illustrated example, in stage 330 intercept module 180, for instance delay module 184 delays the packet.

Refer back to the discussion of FIG. 2 for some examples of how delay module 184 may be configured to delay the packet and for how long. If the packet relates to a wakeup event for a mobile user device, the delay of the packet may cause the duration of a wakeup event to be extended and therefore the start of the next wakeup event for the same mobile user device to be delayed by a time interval.

Otherwise, if the determination is that the packet is not to be delayed (no to stage 320), then in the illustrated example in stage 340 the packet is not delayed.

Method 300 may be repeated for another packet, e.g. another packet accessible to inspection module 180. However method 300 may not necessarily be repeated for all data and control packets. For instance, if only packets relating to wakeup events are inspected, then if the wakeup event has ended (e.g. with the mobile user device detaching from gateway/access network 115, or entering idle or a similar non-active mode) and no new wakeup event has been detected, then method 300 may or may not be repeated (depending on whether or not method 300 is performed when there is no current wakeup event). Additionally or alternatively, if under a certain implementation it is known without inspection that no packet will be delayed, method 300 may not need to be performed. For instance, if due to a light load and/or time of day, no packets need to be delayed, then method 300 may not be repeated.

Alternatively to the example shown in FIG. 3 method 300 may in some other examples include more, less and/or different stages than illustrated in FIG. 3.

Figure 4A:
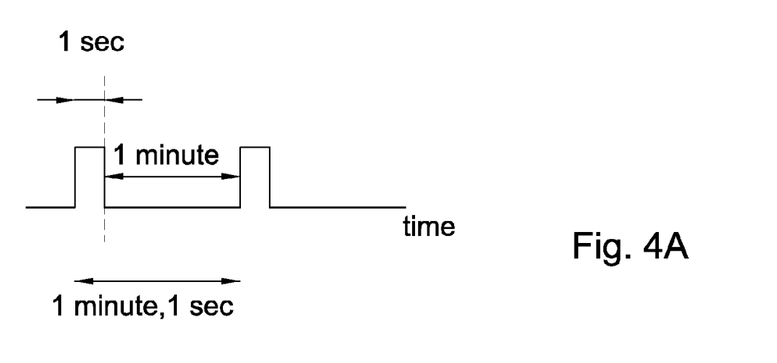
FIG. 4A illustrates an example of a timing diagram for a wakeup event in accordance with the prior art.
Figure 4B:
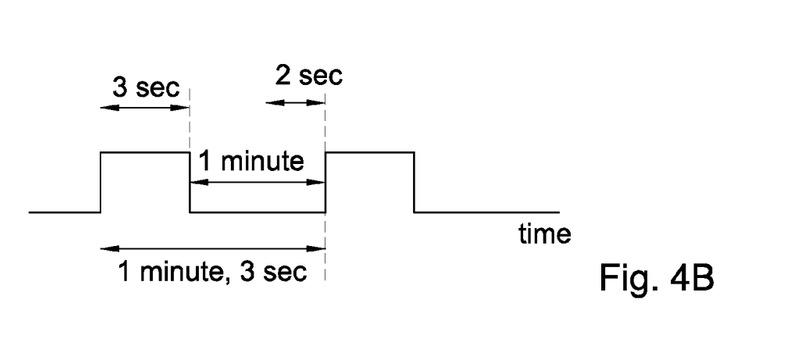
FIG. 4B illustrates an example of a timing diagram for the same wakeup event, in accordance with the presently disclosed subject matter.

FIG. 4A illustrates an example of a timing diagram for a wakeup event in accordance with the prior art. FIG. 4B illustrates an example of a timing diagram for the same wakeup event, in accordance with the presently disclosed subject matter.

In both timing diagrams, it is assumed that a particular mobile user device 110 wakes up, say one minute after the end of the last wake up event for that particular mobile user device. In FIG. 4A, it is assumed that the duration of the wakeup event which includes both control and data packets lasts e.g. 1 second. In FIG. 4B, it is assumed that the duration of the wakeup event is extended by e.g. 2 seconds to be say 3 seconds, by intercept module 180 delaying one or more packets associated with the wakeup event. Since particular mobile user device 110 wakes up a certain amount of time after the end of the last wakeup event, the delay of packet(s) which caused the extension of the wakeup event duration would also cause the start of the next wakeup event for particular mobile user device 110 to be delayed by a time interval, e.g. 2 seconds. It is noted that during the time interval representing the delay in the start of the next wakeup event in FIG. 4B compared to FIG. 4A, the next wakeup event would add to the signaling (and possibly data) load in FIG. 4A but not in FIG. 4B (where the event would not have yet begun) and therefore the signaling (and possibly data) load would be reduced in FIG. 4B compared to FIG. 4A during that time interval.

A delay in the start of the next wakeup event means that the time gap between consecutive starts of wakeup events for the particular mobile user device 110 is extended. Therefore although in FIG. 4A, the time gap between consecutive starts of wakeup events for the particular mobile user device 110 is say one minute and one second, in FIG. 4B the time gap between consecutive starts of wakeup events for the particular mobile user device 110 is extended to say one minute and three seconds. Assuming that the extended time gap between consecutive starts continues over time, the frequency of wakeup events will be diminished. For instance, assume that each time gap between consecutive starts is say one minute and three seconds in network 100 in accordance with the presently disclosed subject matter (with intercept module 180) compared to a prior art network where the time gap is say one minute and one second. In a twenty-four hour period, in a prior art network (without intercept module 180) there would be 1,416.4 wakeup events for the particular mobile user device 110 based on the timing diagram of FIG. 4A. In contrast, in network 100 in accordance with the presently disclosed subject matter (with intercept module 180) in a twenty-four hour period, there would be 1,371.4 wakeup signaling events for particular mobile user device 110 based on the timing diagram of FIG. 4B. This represents a reduction of about 3%. It follows that if the durations of wakeup events were instead extended by 6 seconds, the reduction would be about 9-10%. If, a delay in packet(s) which results in an extension of the duration of each wakeup event by only two seconds for particular mobile user device 110 significantly reduces the wakeup events over a twenty four hour period by about 3%, and therefore reduces the signaling load (and possibly the data load) on the mobile network, it follows that the effect on the signaling load (and possibly data load) when packets are delayed for multiple mobile user devices 110 over a longer period of time may be even more significant.

The extension of the duration of a wakeup event is not bound to any specific amount of time, and may be longer or shorter than the two seconds used in this example. Consequently the time interval by which the start of the next wakeup event is delayed may be greater or less than the two seconds used in this example. In one example the duration of a wakeup event may be extended due to packet delay by at least one second, but this is not necessarily always the case.

For a plurality of wakeup events, the impact on the time-gaps between consecutive starts of wakeup events and the frequency of wakeup events may be greater or less than discussed above. Even short extensions of the duration, due to packet delay imposed by intercept module 180, when proliferated over a certain time frame and/or for many mobile user devices 110 may significantly impact on the signaling load (and optionally the data load).

As mentioned above, in some cases the delayed packet(s) may be data packet(s), and therefore the signaling load may be reduced by delaying data packets(s). In these cases, the disclosed subject matter presents a solution involving data (e.g. delaying data packets) to solve a problem relating to signaling (e.g. the signaling load).

Although the subject matter does not impose limitation on network 100, for further illustration some examples of architecture will now be presented.

Figure 5:
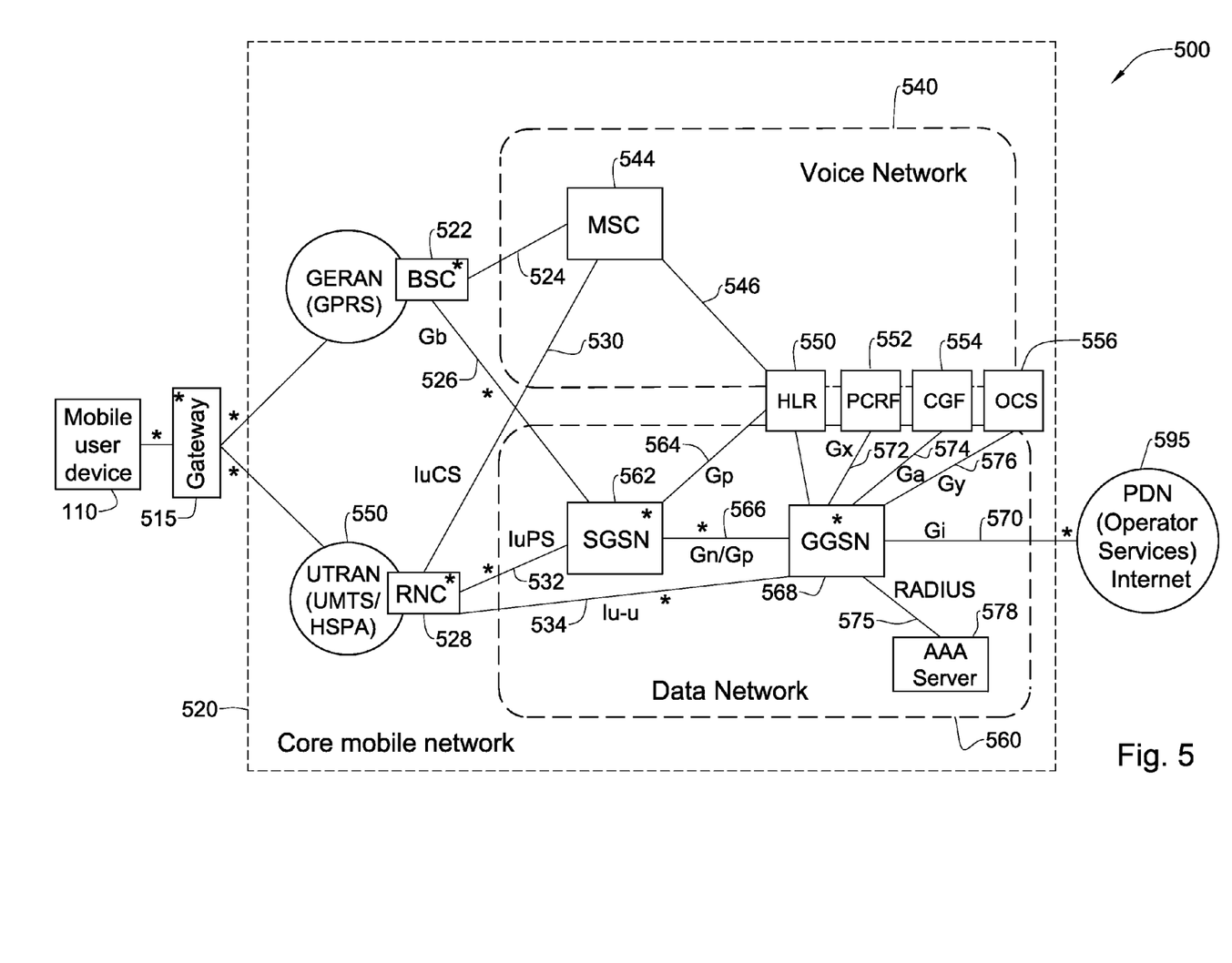
FIG. 5 is a block diagram of an example of a network including a mobile network of GPRS/UMTS architecture with reduced signaling load, in accordance with the presently disclosed subject matter.

FIG. 5 is a block diagram of an example of a network 500 including a mobile network of GPRS/UMTS architecture with reduced signaling load, in accordance with the presently disclosed subject matter.

Network 500 is an example of network 100 discussed above.

Network 500 includes one or more mobile user device(s) 110 and gateway(s) 515. For simplicity of illustration only one mobile user device 110 and gateway 515 are shown in FIG. 5. In the illustrated example, mobile user device 110 connects via gateway 515 to core mobile network 520. Gateway 515 is an example of gateway/access network 115. For instance in UTMS architecture, gateway 515 may be termed "nodeB", and in Global System for Mobile Communications (GSM) or GPRS architecture, gateway 515 may be termed "base transceiver station". Other terms that may be used for gateway 515 in network 500 include radio base station or base station.

Core mobile network 520 is an example of core mobile network 120. Core mobile network 520 includes one or more base station controllers (BSCs) 522 and/or one or more radio network controllers (RNCs) 520. For simplicity of illustration only one BSC 522 and one RNC 520 are illustrated in FIG. 5. BSC 522 is used in GSM Enhanced Data rates for GSM Evolution (EDGE) Radio Access Network (Geran) or GPRS architecture as well as in combined UMTS/GSM architecture. RNC 528 is used in UMTS architecture. Universal Terrestrial Radio Access Network (UTRAN) refers to a collection of RNCs and nodeBs. The UMTS architecture may use High Speed Packet Access HSPA.

An interface 524 may interface between BSC 522 and voice network 540 and/or a Gb interface 526 may interface between BSC 522 and data network 560. An interface 530 may interface between RNC 528 and voice network 540 and/or an IuPS interface 532 and/or an Iu-u interface 534 may interface between RNC 528 and data network 560.

In the illustrated example, core mobile network 520 also includes data network 560 and optionally voice network 540. Although for simplicity of illustration only one element of each type in networks 560 and 540 is illustrated in FIG. 5, it is possible that a different implementation may include multiple elements of any given type. Optionally core mobile network 520 may also include any of the following modules: Home Location Registrar (HLR) 550, Policy and charging rules function (PCRF) 552, Charging Gateway Function (CGF) 554, and/or Online Charging System (OCS) 556.

In the illustrated example, voice network 540 includes a mobile switching center (MSC) 544. An interface 546 may interface between MSC 544 and HLR 550. In the illustrated example, data network 560 includes a Serving GPRS Node (SGSN), a Gateway GPRS Support Node (GGSN), and optionally an Authentication, Authorization, and Accounting (AAA) server 575 A Gn/Gp interface 566 may interface between SGSN 562 and GGSN 566. A Gr interface 564 may interface between SGSN 562 and HLR 550. A Gx interface 572 may interface between PCRF 552 and GGSN 568. A Ga interface 574 may interface between CGF 554 and GGSN 568. A Gy interface 576 may interface between OCS 556 and GGSN 568. A Remote Authentication Dial In User Service (RADIUS) protocol 575 may be used as a protocol between GGSN 568 and AAA server 578.

In the illustrated example, network 500 also includes PDN 595. A Gi interface 570 may interface between data network 560 and PDN 595.

Asterisks ("*") in FIG. 5 illustrate possible locations of intercept module 180 or any part thereof. For instance, intercept module 180 or any part thereof may be located between mobile device 110 and gateway 515, between gateway 515 and RNC 528, between gateway 515 and BSC 522, between RNC 528 and SGSN 562, between BSC 522 and SGSN 562, between RNC 528 and GGSN 568, between SSGN 562 and GGSN 568, between GGSN 568 and PDN 595, in gateway 515, in RNC 528, in BSC 522, in SGSN 562, in GGSN 568, etc. Intercept module 180 may be configured to adopt one or more protocols depending on the location of intercept module 180 or any part thereof in network 500.

Figure 6:
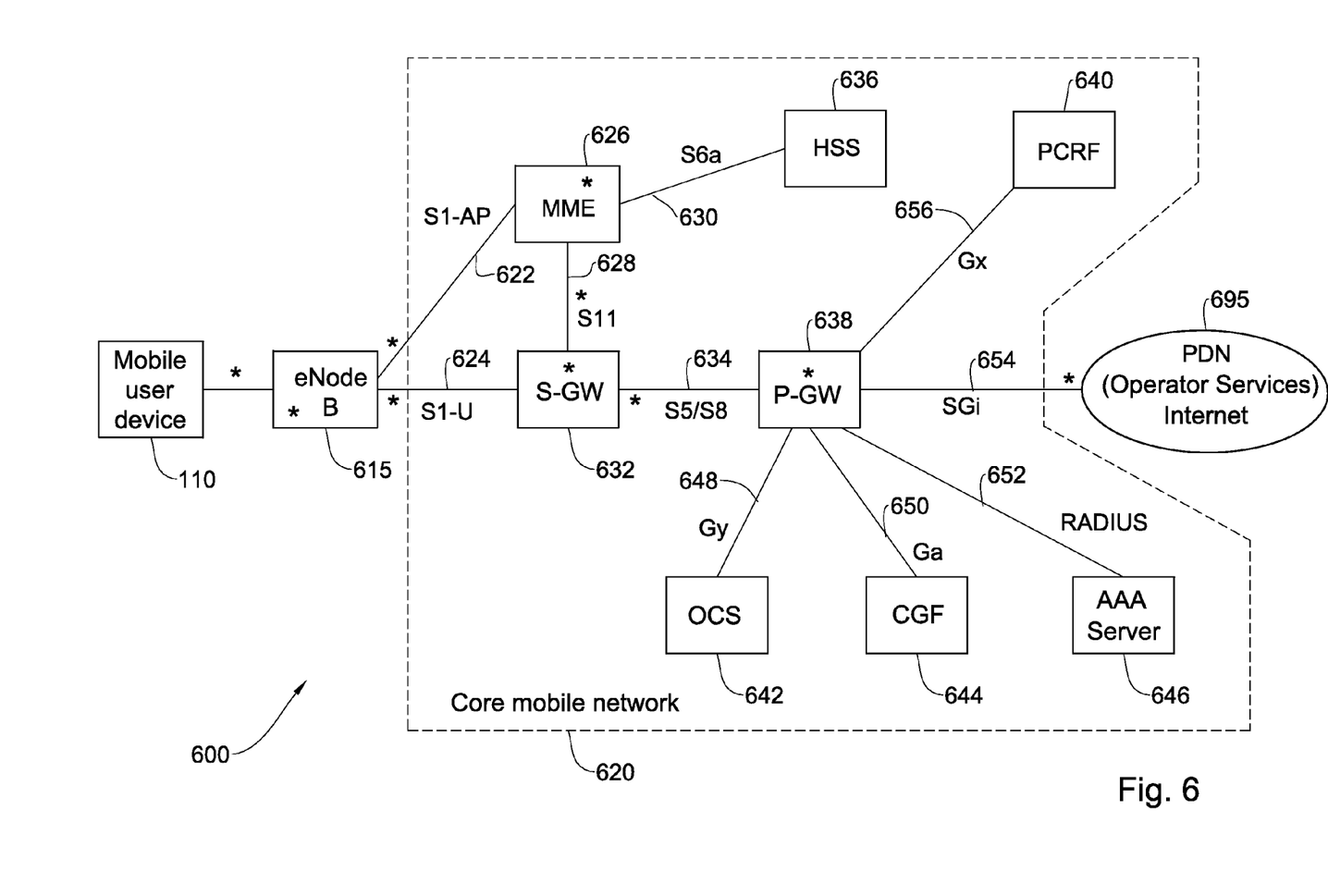
FIG. 6 is a block diagram of an example of a network including a mobile network of LTE architecture with reduced signaling load, in accordance with the presently disclosed subject matter.

FIG. 6 is a block diagram of an example of a network including a mobile network of LTE architecture with reduced signaling load, in accordance with the presently disclosed subject matter.

Network 600 is an example of network 100 discussed above.

Network 600 includes one or more mobile user device(s) 110 and enodeBs 515. For simplicity of illustration only one mobile user device 110 and enodeB 615 are shown in FIG. 6. In the illustrated example, mobile user device 110 connects via enodeB 615 to core mobile network 620. EnodeB 615 is an example of gateway/access network 115. EnodeB is a base station and tunnel end point for S1U tunnels.

Core mobile network 620 is an example of core mobile network 120. Although for simplicity of illustration only one element of each type in network 620 is illustrated in FIG. 6, it is possible that a different implementation may include multiple elements of any given type. In the illustrated example, core mobile network 620 includes a Serving Gateway (S-GW) 632, a Mobility Management Entity (MME) 626 and a PDN Gateway (P-GW) 638. An S1-U interface 624 may interface between enodeB 615 and S-GW 632. An S1-AP interface 622 may interface between enodeB 615 and MME 626. An S11 interface 628 may interface between MME 626 and S-GW 632. An S5/S8 interface 634 may interface between S-GW 632 and P-GW 638.

Optionally core mobile network 620 may also include any of the following: a Home Subscriber Server (HSS) 636, a PCRF 640, an OCS 642, a CGF 644, and/or an AAA server 646. An S6a interface 630 may interface between MME 626 and HSS 636. A Gy interface 648 may interface between OCS 642 and P-GW 638. A Ga interface 650 may interface between CGF 644 and P-GW 638. A Gx interface 656 may interface between PCRF 640 and P-GW 638. A RADIUS protocol 652 may be used as a protocol between P-GW 638 and AAA server 646.

In the illustrated example, network 600 also includes PDN 695. An sGi interface 654 may interface between core mobile network 620 and PDN 695.

Asterisks ("*") in FIG. 6 illustrate possible locations of intercept module 180 or any part thereof. For instance, intercept module 180 or any part thereof may be located between mobile device 110 and e-nodeB 615, between e-nodeB 615 and MME 626, between enodeB 615 and SGW 632, between MME 626 and SGW 632, between S-GW 632 and P-GW 638, between P-GW 638 and PDN 695, in e-nodeB 615, in MME 626, in S-GW 632, in P-GW 638, etc. Intercept module 180 may be configured to adopt one or more protocols depending on the location of intercept module 180 or any part thereof in network 600.

Figure 7:
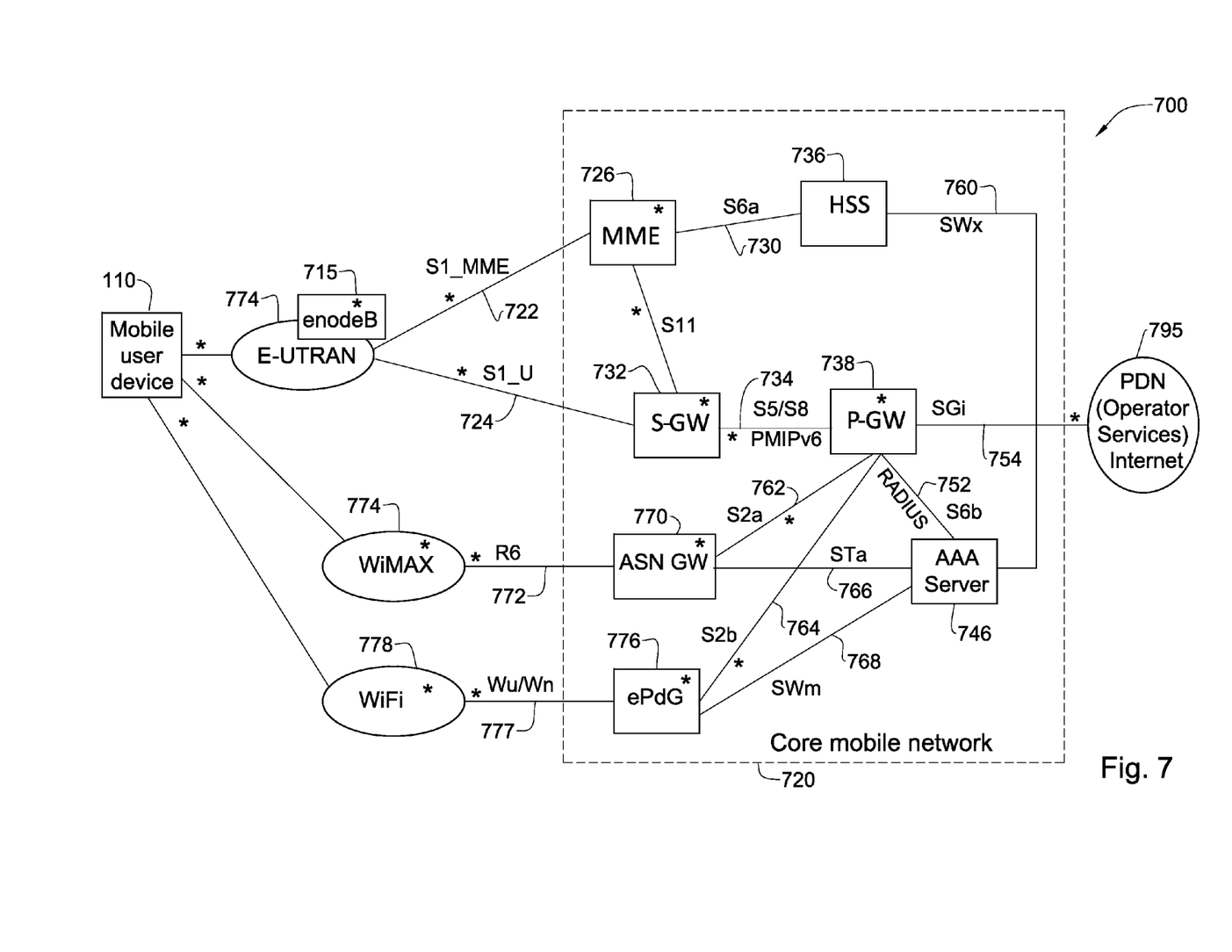
FIG. 7 is a block diagram of an example of a network including a mobile network with reduced signaling load of LTE architecture interworked with WiMAX/WiFi, in accordance with the presently disclosed subject matter.

FIG. 7 is a block diagram of an example of a network including a mobile network with reduced signaling load of LTE architecture interworked with WiMAX/WiFi, in accordance with the presently disclosed subject matter.

Network 700 is an example of network 100 discussed above.

Network 700 includes one or more mobile user device(s) 110 and enodeBs 715 as well as a WiMAX access network 774 and/or a WiFi access network 778. EnodeB 715, WiMAX access network 774, and WiFi access network 778 are examples of gateway/access network 115. EnodeB is a base station and tunnel end point for S1U tunnels. (Evolved Universal Terrestrial Radio Access Network (E-UTRAN) refers to a collection of enodeBs). For simplicity of illustration only one mobile user device 110 and enodeB 715 are shown in FIG. 7. In the illustrated example, mobile user device 110 may connect via enodeB 715, WiMAX 774, or WiFi 778 to core mobile network 720.

Core mobile network 720 is an example of core mobile network 120. Although for simplicity of illustration only one element of each type in network 720 is illustrated in FIG. 7, it is possible that a different implementation may include multiple elements of any given type. In the illustrated example, core mobile network 620 includes an S-GW 732, an MME 726, a P-GW 738, as well as an Access Service Network Gateway (ASN-GW) 770 and/or an Evolved Packet Data Gateway (ePDG) 776. An S1-U interface 724 may interface between enodeB 715 and S-GW 732. An S1-MME interface 722 may interface between enodeB 715 and MME 726. An S11 interface 728 may interface between MME 726 and S-GW 732. An S5/S8 PMIPv6 interface 734 may interface between S-GW 732 and P-GW 738. An R6 interface 772 may interface between WiMAX 774 and ASN-GW 770. An S2a interface 762 may interface between ASN-GW 770 and P-GW 738. A WuWn interface 777 may interface between WiFi 778 and ePDG 776. An S2b interface 764 may interface between ePDG 776 and P-GW 738.

Optionally core mobile network 620 may include any of the following: an HSS 736 and/or an AAA server 746. An S6a interface 730 may interface between MME 726 and HSS 736. An Swx interface 760 may interface between HSS 736 and AAA server 746. An STa interface may interface between ASN-GW 770 and AAA server 746. An SWm interface 768 may interface between ePDG 776 AAA server 746. A RADIUS protocol 752 may be used as a protocol between P-GW 738 and AAA server 746.

In the illustrated example, network 700 also includes PDN 795. An sGi interface 754 may interface between core mobile network 720 and PDN 795.

Asterisks ("*") in FIG. 7 illustrate possible locations of intercept module 180 or any part thereof. For instance, intercept module 180 or any part thereof may be located between mobile device 110 and e-nodeB 715, between mobile device 110 and WiMAX 774, between mobile device 110 and WiFi 778, between e-nodeB 715 and MME 726, between enodeB 715 and SGW 732, between WiMAX 774 and ASN GW 770, between WiFi 778 and ePDG 776, between MME 726 and S-GW 732, between S-GW 732 and P-GW 738, between ASN GW 770 and P-GW 738, between ePDG 776 and P-GW 738, between P-GW 738 and PDN 795, within WiMAX 774, within WiFi 778, in enodeB 715, in MME 726, in S-GW 732, in ASN GW 770, in ePdG 776, in P-GW 738, etc. Intercept module 180 may be configured to adopt one or more protocols depending on the location of intercept module 180 or any part thereof in network 700.

It will be understood that the subject matter contemplates, for example, a computer program being readable by a computer for executing a method or part of a method disclosed herein. Further contemplated by the subject matter, for example, is a computer-readable memory tangibly embodying program code readable by a computer for executing a method or part of a method disclosed herein.

While examples of the subject matter have been shown and described, the subject matter is not thus limited. Numerous modifications, changes and improvements within the scope of the subject matter will now occur to the reader.

The invention claimed is:

1. An intercept module capable of reducing signaling load on a mobile network, comprising:
an inspection module capable of inspecting intercepted packets originating from a plurality of mobile devices, to determine packets transmitted from a respective mobile device to a public data network due to a wakeup event of the respective mobile device and to determine packets to be delayed from among the packets determined to have been transmitted due to a wakeup event; and
a delay module configured to determine a delay duration for packets originating from the plurality of mobile devices, determined to be delayed by the inspection module, and configured to delay said packets for the entire determined delay duration and upon elapse of the determined delay duration, from reception of the packet by the intercept module, to forward the packet to its intended destination, thereby causing a start of a next wakeup event for said mobile device to be delayed by a time interval, and a consequent reduction in the signaling load on the mobile network during said interval compared to the signaling load that would have been on the mobile network during said interval if said start had not been delayed.

2. The intercept module of claim 1, wherein at least one of the delayed packets is a data packet.

3. The intercept module of claim 1, wherein said delay module is capable of delaying said packets by storing said packets temporarily in memory.

4. The intercept module of claim 1, wherein the delay module is configured to determine a fixed delay duration for all packets determined to be delayed by the inspection module.

5. The intercept module of claim 1, wherein the delay module is configured to determine the delay duration based on identification of the mobile device.

6. The intercept module of claim 1, wherein the delay module is configured to determine the delay duration based on a load on the mobile network.

7. The intercept module of claim 1, wherein the delay module is configured to determine the delay duration of a packet based on a type of a session to which the delayed packet belongs.

8. A method of reducing signaling load on a mobile network, comprising:
intercepting packets originating from mobile devices, by a module separate from the mobile devices on a path between the mobile devices and public data network;
inspecting the intercepted packets to determine that at least one packet originating from a mobile device is to be delayed at least partly because said at least one packet was transmitted from the mobile device to a public data network due to a wakeup event of the transmitting mobile device;
determining a delay duration, from interception until forwarding, for the at least one packet determined to be delayed; and
delaying said at least one packet originating from the mobile device for the determined delay duration and upon elapse of the determined delay duration from interception, forwarding the packet to its intended destination, thereby causing a start of a next wakeup event for said mobile device to be delayed by a time interval, and a consequent reduction in the signaling load on the mobile network during said interval compared to the signaling load that would have been on the mobile network during said interval if said start had not been delayed.

9. The method of claim 8, wherein only one packet relating to said wakeup event is delayed.

10. The method of claim 8, wherein a plurality of packets relating to said wakeup event is delayed.

11. The method of claim 8, wherein said determining includes: determining that a packet is to be delayed at least partly because said packet is a data packet.

12. The method of claim 8, wherein said determining includes: determining that a packet is to be delayed at least partly based on time or number of packets since a previous packet delay.

13. The method of claim 8, wherein said determining includes: determining that a packet is to be delayed at least partly based on mobile device identification.

14. The method of claim 8, wherein said determining includes: determining that a packet is to be delayed at least partly based on flow direction of packet.

15. The method of claim 8, wherein said determining includes: determining that a packet is to be delayed at least partly based on at least one preceding packet.

16. The method of claim 8, wherein said determining includes: determining that a packet is to be delayed at least partly based on load.

17. The method of claim 8, wherein at least one of said at least one packet is delayed by a variable delay whose value is dependent on at least one factor.

18. The method of claim 17, wherein said factor includes at least one selected from a group comprising: timing, identification of mobile device, load, policy, service identification, or network happening.

19. The method of claim 8, wherein delaying the at least one packet comprises delaying a plurality of packets originating from the mobile device by a standard fixed duration delay.

20. The method of claim 8, wherein determining the delay duration for the at least one packet determined to be delayed comprises determining for each packet a randomly selected variable delay.

21. The method of claim 8, wherein determining the delay duration for the at least one packet determined to be delayed comprises determining a fixed delay duration for all packets determined to be delayed.

22. The method of claim 8, wherein determining the delay duration for the at least one packet determined to be delayed comprises determining the delay duration based on identification of the mobile device.

23. The method of claim 8, wherein determining the delay duration for the at least one packet determined to be delayed comprises determining the delay duration based on a load on the mobile network.

24. The method of claim 8, wherein determining the delay duration for the at least one packet determined to be delayed comprises determining the delay duration based on a type of a session to which the delayed packet belongs.

25. The method of claim 8, comprising forwarding the at least one packet to its intended destination after the determined delay duration has elapsed.

26. The method of claim 8, wherein determining that at least one packet is to be delayed comprises determining that a control packet is to be delayed.

27. The method of claim 8, wherein determining that at least one packet is to be delayed comprises determining that the at least one packet originated from a mobile device due to a wakeup event of the mobile device.

28. A computer program product comprising a non-transitory computer useable medium having computer readable program code embodied therein for reducing signaling load on a mobile network, the computer program product comprising:

computer readable program code for causing the computer to intercept packets originating from a plurality of mobile devices, to inspect the intercepted packets and determine packets to be delayed, at least partly because said packets were transmitted from respective mobile devices to a public data network due to a wakeup event a of the transmitting mobile device; and computer readable program code for causing the computer to determine a delay duration, from reception by the computer until forwarding, for packets originating from the plurality of mobile devices, determined to be delayed and to delay said packets for the determined delay duration and upon elapse of the determined delay duration from reception by the computer to forward the packet to its intended destination, thereby causing a start of a next wakeup event for said mobile device to be delayed by a time interval, and a consequent reduction in the signaling load on the mobile network during said interval compared to the signaling load that would have been on the mobile network during said interval if said start had not been delayed.

* * * * *